United States Patent
Chiang (10) Patent No.: US 7,513,723 B1
(45) Date of Patent: Apr. 7, 2009

(54) TRAVEL LIMIT DETECTION/CONTROL DEVICE FOR MILLING MACHINE TABLE

(76) Inventor: Yu-Ching Chiang, No. 26, Alley 13, Lane 206, Longshou St., Taoyuan City, Taoyuan County 33057 (TW)

(*) Notice: Subject to any disclaimer, the term of this patent is extended or adjusted under 35 U.S.C. 154(b) by 0 days.

(21) Appl. No.: 12/141,168

(22) Filed: Jun. 18, 2008

(51) Int. Cl.
B23C 1/00 (2006.01)
B23Q 5/52 (2006.01)

(52) U.S. Cl. ............... 409/153; 409/155; 409/151; 192/142 R; 318/468

(58) Field of Classification Search ........... 409/145, 409/147, 149, 151, 153, 152, 155, 171; 408/12, 408/13, 10, 8, 62; 192/142 R; 318/468, 318/466
See application file for complete search history.

(56) References Cited

U.S. PATENT DOCUMENTS

| | | | | |
|---|---|---|---|---|
| 1,124,117 A | * | 1/1915 | Einstein | 409/151 |
| 1,761,121 A | * | 6/1930 | Graves et al. | 192/143 |
| 2,121,923 A | * | 6/1938 | Neubert | 409/153 |
| 2,533,753 A | * | 12/1950 | Armitage et al. | 409/151 |
| 3,733,961 A | * | 5/1973 | Reynolds | 409/153 |

* cited by examiner

*Primary Examiner*—Erica E Cadugan
(74) *Attorney, Agent, or Firm*—Alan Kamrath; Kamrath & Associates PA

(57) ABSTRACT

A travel limit detection/control device for a milling machine table driven by a screw rod includes a power input section driven by the screw rod, a reduction/output section coupled to and driven by the power input section, and first and second activating members for cutting power supply to the screw rod. A first travel setting member has a first end coupled to and driven by the reduction/output section and a second end that comes in contact with the first activating member when the table reaches a first travel limit. A second travel setting member has a first end coupled to and driven by the reduction/output section and a second end that comes in contact with the second activating member when the table reaches a second travel limit. Positions of the first and second travel setting members can be adjusted to change the first and second travel limits of the table.

8 Claims, 12 Drawing Sheets

TRAVEL LIMIT DETECTION/CONTROL DEVICE FOR MILLING MACHINE TABLE

BACKGROUND OF THE INVENTION

The present invention relates to a travel limit detection/control device for a milling machine and, more particularly, to a travel limit detection/control device for a table of a milling machine.

Figure 1:
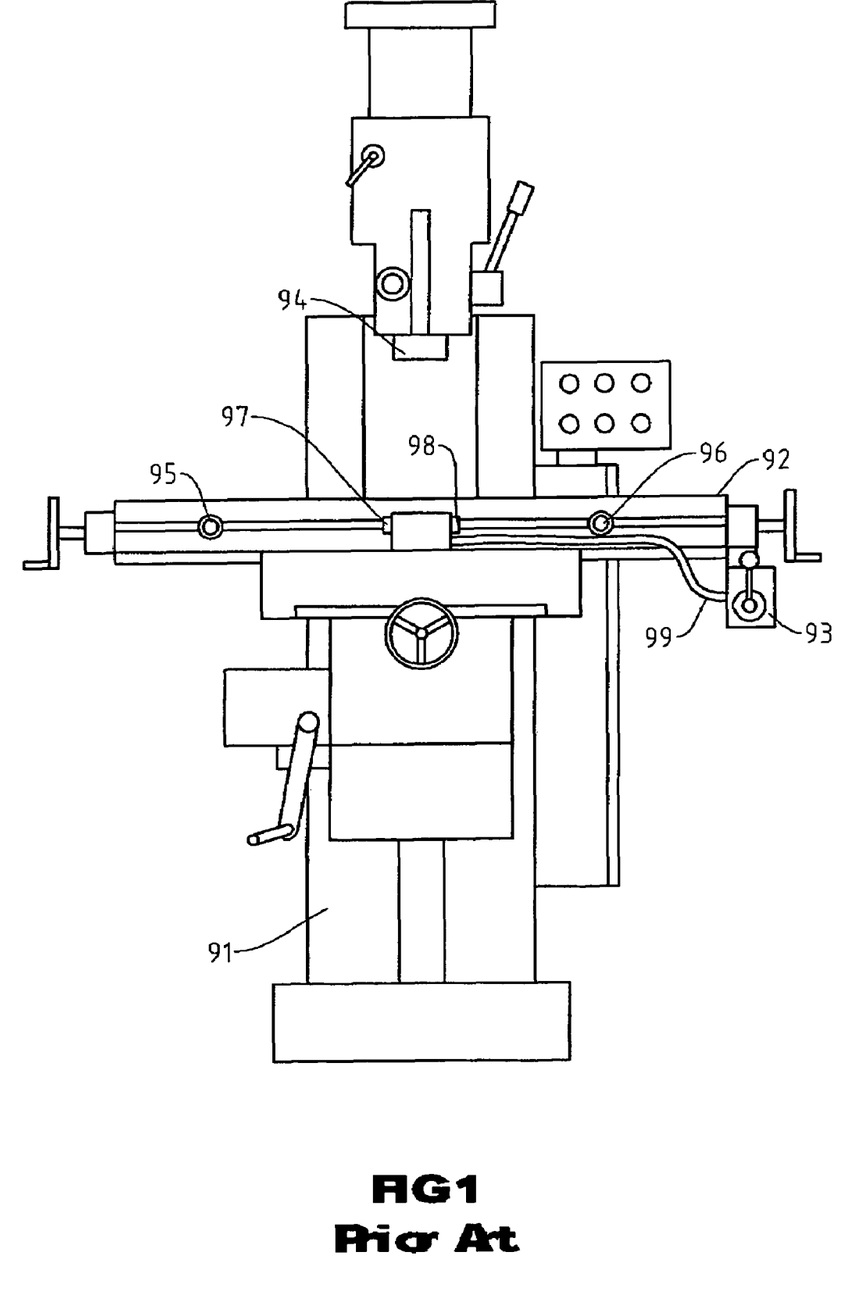
FIG. 1 shows a side view of a conventional milling machine.

Milling machines are widely utilized to mill various workpieces to obtain planar faces, curved faces, angled portions, gears, holes, grooves, cams, etc. and capable of achieving high yield at high speed through change of cutters. FIG. 1 shows a typical milling machine including a frame 91 mounted on the ground and a table 92 slideably mounted on frame 91. Table 92 is driven by a power device 93 such as an electric motor to move reciprocatingly on frame 91 so that a workpiece placed on table 92 can be milled by cutters mounted on a turret located above table 92. The milling machine further includes left and right activators 95 and 96 and left and right limit switches 97 and 98 for limiting left and right travels of table 92. In practice, leftward and rightward travels of table 92 are set based on the size of the workpiece that is measured beforehand, avoiding useless travels of table 92, enhancing processing efficiency, and saving processing time. However, limit switches 97 and 98 are exposed on table 92 and, thus, liable to be damaged by inadvertent impact. Furthermore, long exterior wires 99 connected to the exposed limit switches 97 and 98 are required. Exposed wires 99 not only adversely affect the appearance of the milling machine but are liable to wear and break, incurring time and costs for repair.

A need exists for a travel limit detection/control device for a milling machine table without utilizing exposed wires and exposed limit switches while allowing reliable detection and control of travel limits of the table through simple operation.

BRIEF SUMMARY OF THE INVENTION

The present invention solves this need and other problems in the field of travel limit detection by providing a travel limit detection/control device for a table of a milling machine. The milling machine includes a feeding device having a screw rod connected to the table. The table is movable between first and second travel limits. The travel limit detection/control device includes a power input section adapted to be driven by the screw rod, a reduction/output section coupled to and driven by the power input section, and first and second activating members adapted for cutting power supply to the feeding device. The travel limit detection/control device further includes a first travel setting member having a first end coupled to and driven by the reduction/output section and a second end. The second end of the first travel setting member comes in contact with the first activating member when the table reaches the first travel limit, and the first activating member cuts power supply to the feeding device. The travel limit detection/control device further includes a second travel setting member having a first end coupled to and driven by the reduction/output section and a second end. The second end of the second travel setting member comes in contact with the second activating member when the table reaches the second travel limit, and the second activating member cuts power supply to the feeding device.

Preferably, the screw rod includes a worm section, and the power input section includes a worm wheel meshed with the worm section. The reduction/output section includes a reduction gear train having an output shaft and an output gear mounted on the output shaft, and the first ends of the first and second travel setting members are coupled to and driven by the output shaft.

Preferably, the output shaft includes a screw hole in an end face thereof. The first end of the first travel setting member includes a first through-hole aligned with the screw hole. The first end of the second travel setting member includes a second through-hole aligned with the first through-hole and the screw hole. A screw is extended through the through-holes and the screw hole, allowing joint rotation of the first and second travel setting members and the output shaft.

Preferably, the output gear includes a plurality of annularly spaced positioning holes in a side thereof. The positioning holes surround and are concentric with the screw hole. The first travel setting member further includes a first intermediate portion between the first and second ends thereof. A first extension extends outward from the first intermediate portion and includes a first arcuate slot having a length larger than a diameter of each positioning hole. The first arcuate slot is concentric with the positioning holes and extends across at least one of the positioning holes. The second travel setting member further includes a second intermediate portion between the first and second ends thereof. A second extension extends outward from the second intermediate portion and includes a second arcuate slot having a length larger than the diameter of each positioning hole. The second arcuate slot is concentric with the positioning holes and extended across at least one of the positioning holes. A first positioning member is removably extended through the first arcuate slot into one of the positioning holes. A second positioning member is removably extended through the second arcuate slot into another of the positioning holes.

Preferably, the side of the output gear includes an annular flange extending outward in a direction parallel to an axis of the output shaft. The annular flange includes an outer end face perpendicular to the axis of the output shaft. The positioning holes are formed in the outer end face.

Preferably, the travel limit detection/control device further includes a control box having a control box body receiving the power input section and the reduction/transmission section, a panel having an opening, and an inner frame. A spacing is formed between the panel and the inner frame. The reduction gear train includes a shaft on which the worm wheel is mounted. The shaft and the output shaft are rotatably supported by the inner frame. The output gear and the end of the output shaft are received in the spacing between the panel and the inner frame. The annular flange is received in the opening of the panel.

The present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Figure 2:
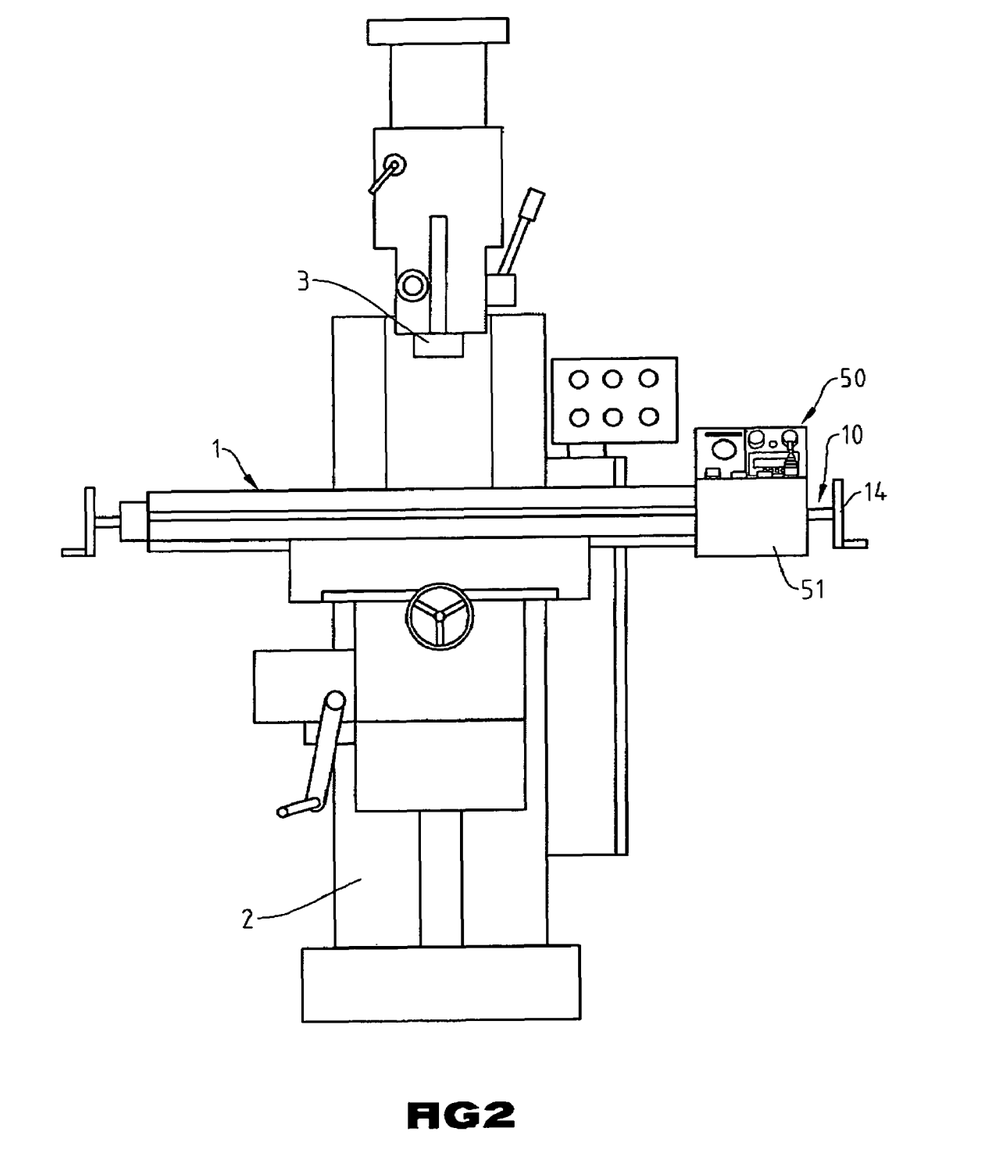
FIG. 2 shows a diagrammatic side view of a milling machine utilizing a travel limit detection/control device according to the preferred teachings of the present invention.
Figure 3:
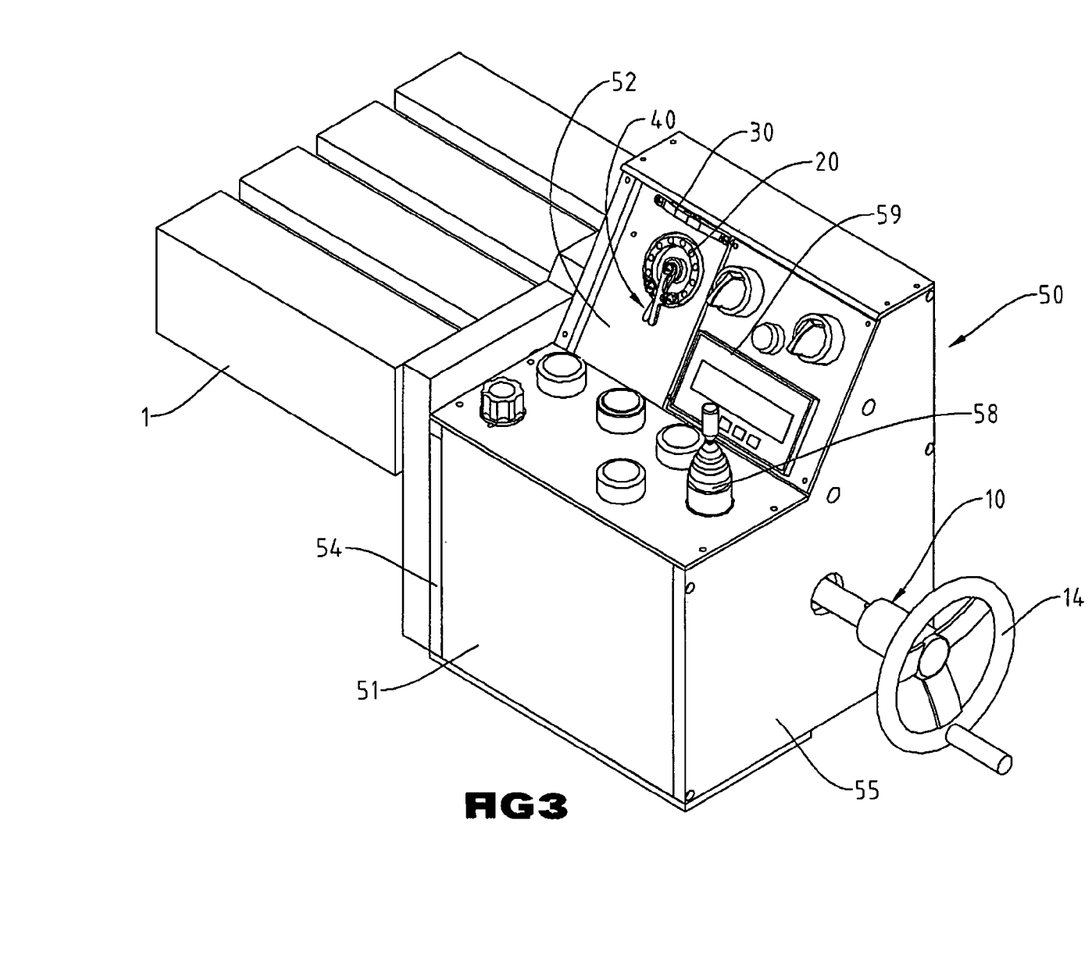
FIG. 3 shows a partial, perspective view of the milling machine of FIG. 2.
Figure 4:
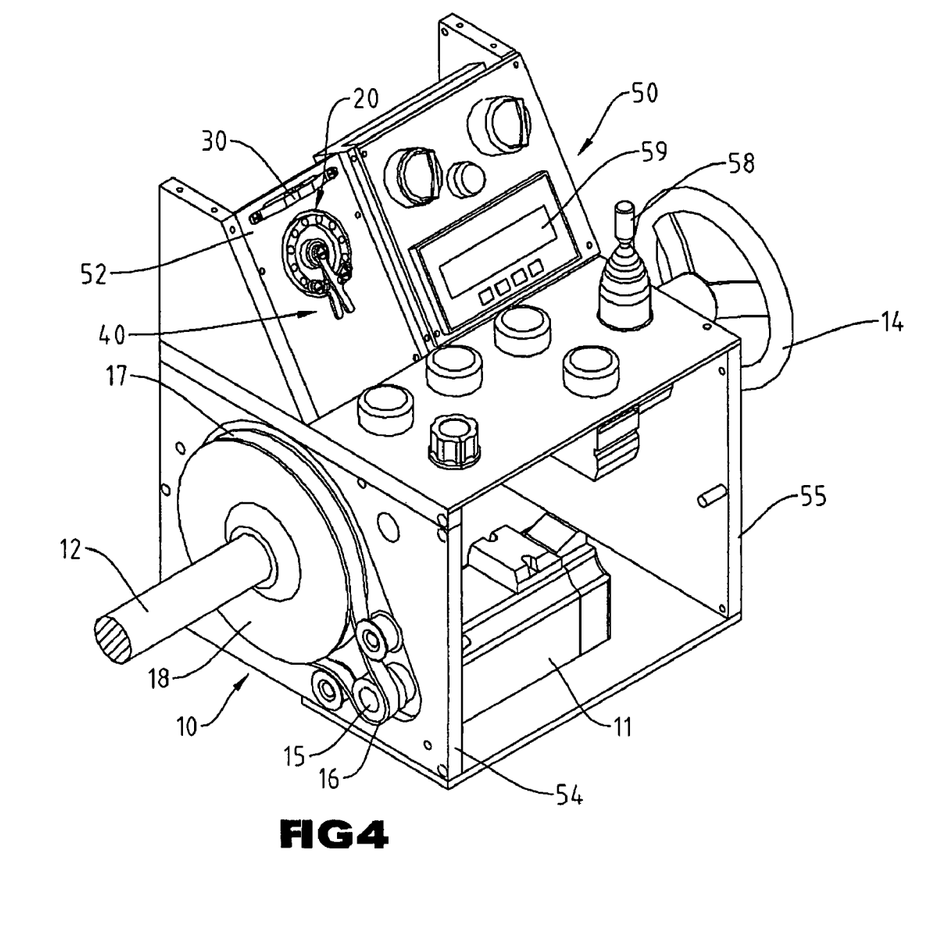
FIG. 4 shows a front, perspective view of a control box of the milling machine of FIG. 2 with a front wall of the control box removed to show an interior of the control box.

FIG. 2 shows a milling machine utilizing a travel limit detection/control device according to the preferred teachings of the present invention. The milling machine includes a frame 2, a table 1 slideably mounted to frame 2, and a turret 3 mounted above table 1. A plurality of cutters are mounted on turret 3 for milling a workpiece placed on table 1. The milling machine further includes a screw rod 12 (FIG. 4) connected to table 1 and a feeding device 10 having an electric motor 11 such as a servomotor for driving screw rod 12 and table 1. Electric motor 11 includes an output shaft 15 connected to screw rod 12 via a transmission device in the most preferred form shown as a belt and pulley transmission device including a pulley 16 mounted around output shaft 15 to turn therewith, a pulley 18 mounted around screw rod 12 to turn therewith, and a belt 17 mounted around pulleys 16 and 18. Thus, table 1 can be moved by electric motor 11. Other forms of the transmission device would be within the skill of the art. The travel limit detection/control device according to the preferred teachings of the present invention is utilized to set and control left and right travel limits of table 1 to match the leftward and rightward travels of table 1 according to the size of the workpiece to be milled.

According to the preferred form shown, the travel limit detection/control device includes a reduction/transmission mechanism 20, a power breakdown mechanism 30, and a travel transmission mechanism 40. When table 1 reaches the left or right travel limit, the travel limit detection/control device cuts power supply to feeding device 10.

Figure 5:
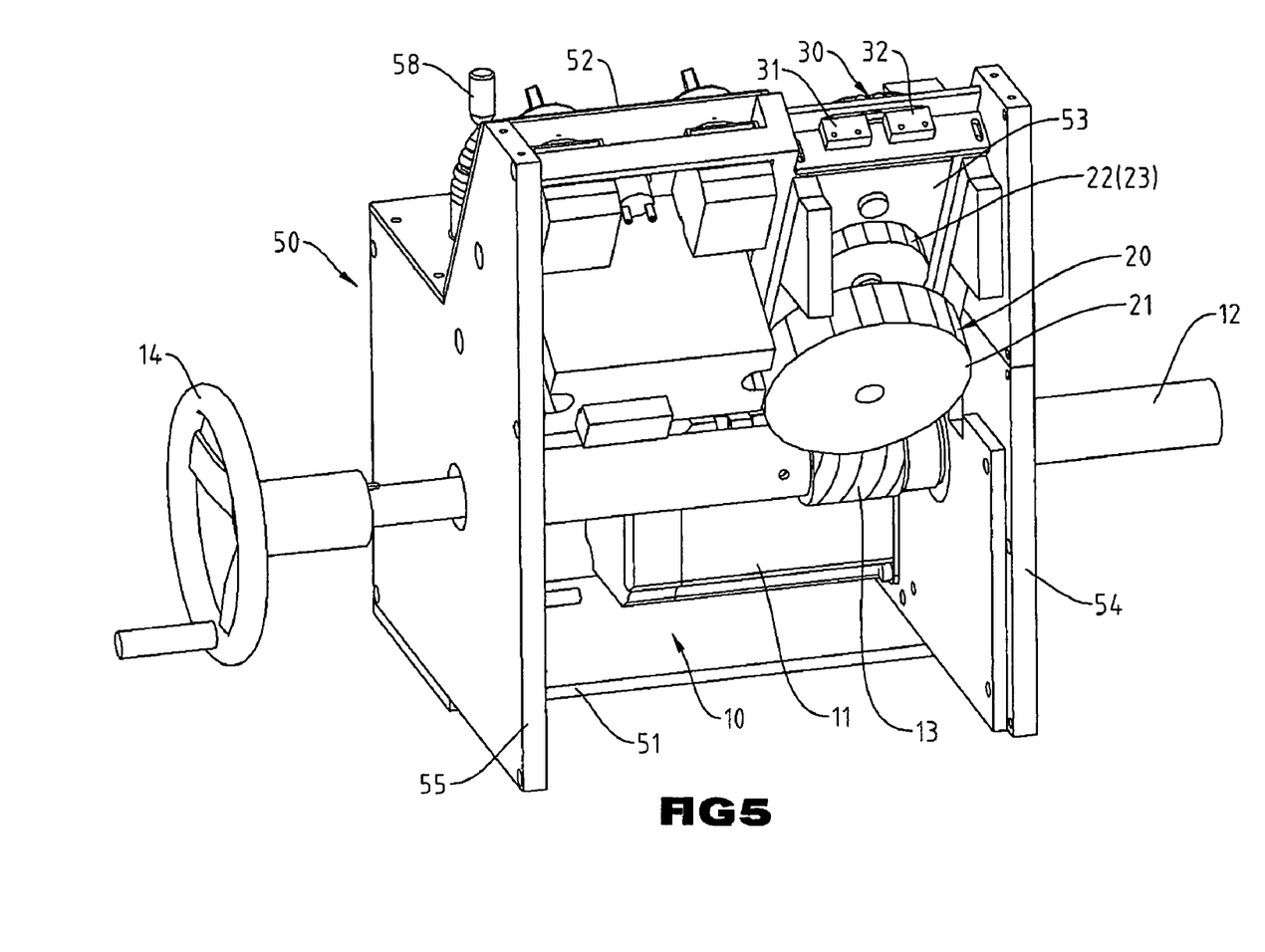
FIG. 5 shows a rear, perspective view of the control box of the milling machine of FIG. 4 with a rear wall of the control box removed to show the interior of the control box.
Figure 6:
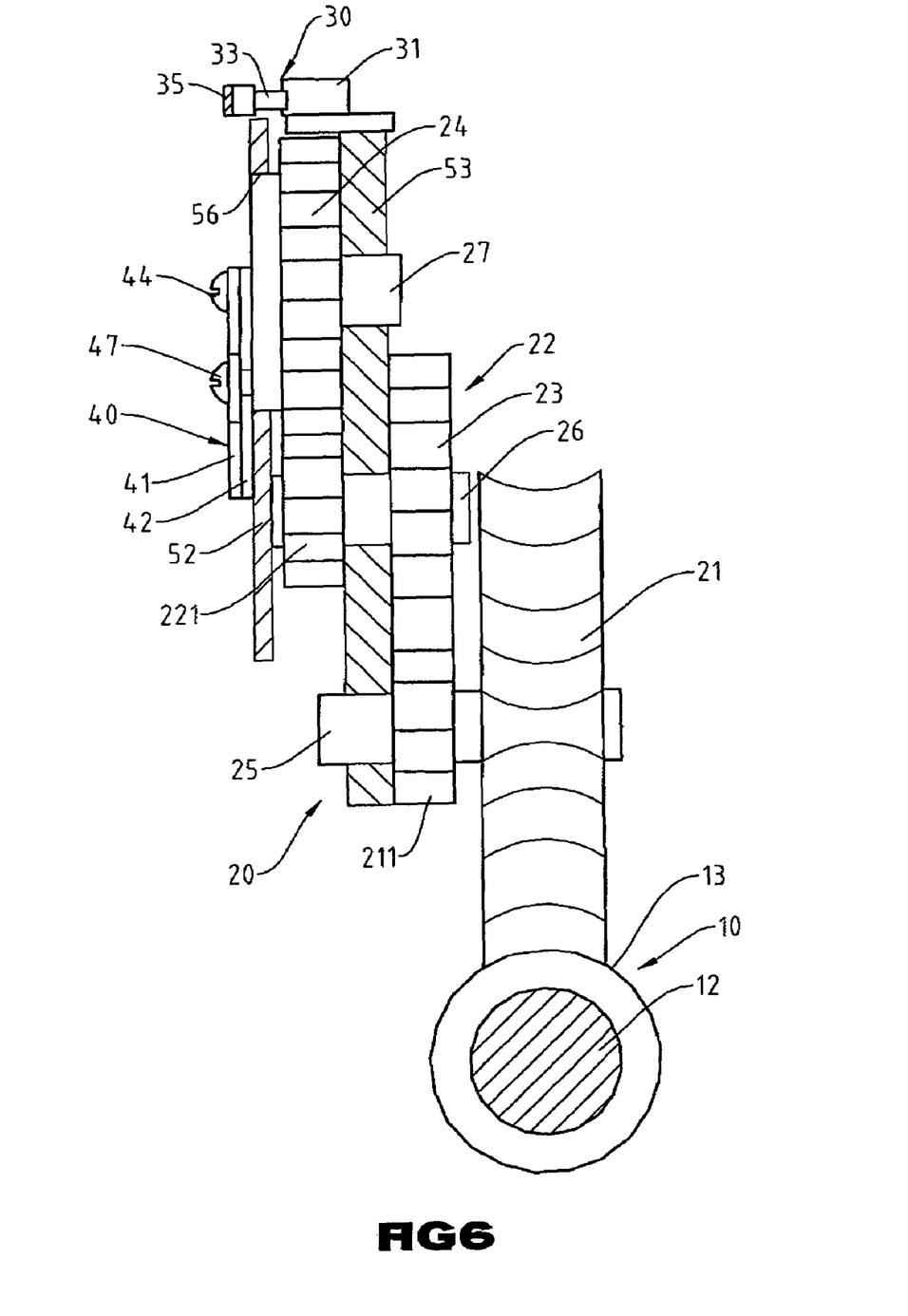
FIG. 6 shows a cross-sectional view of the travel limit detection/control device of FIG. 4.
Figure 7:
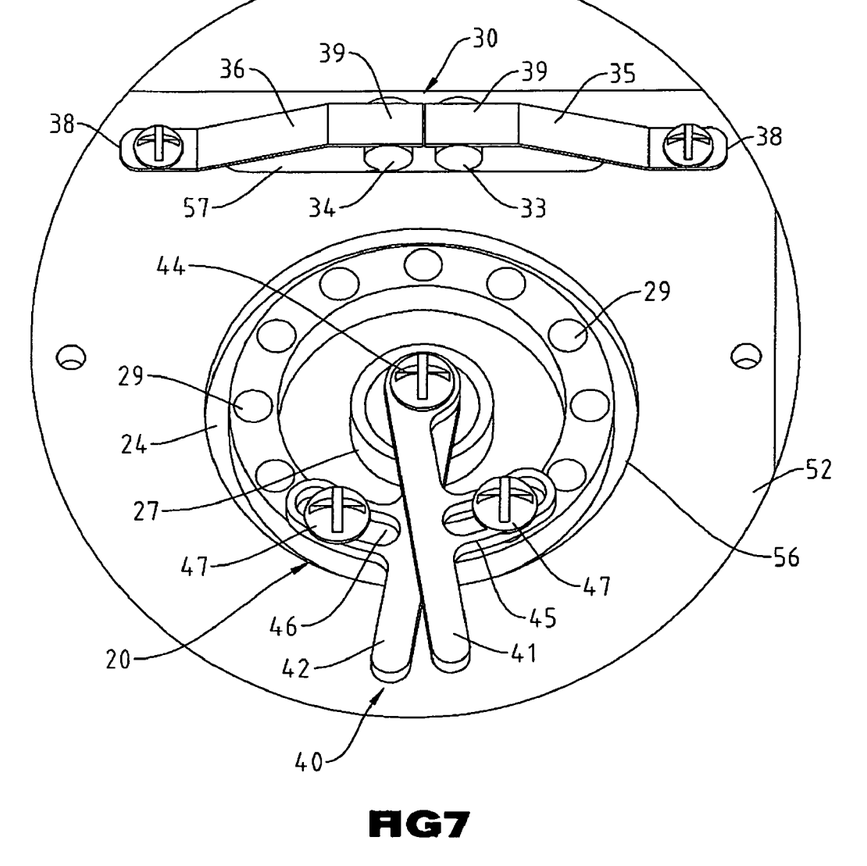
FIG. 7 shows an enlarged view of a portion of the milling machine of FIG. 4.
Figure 8:
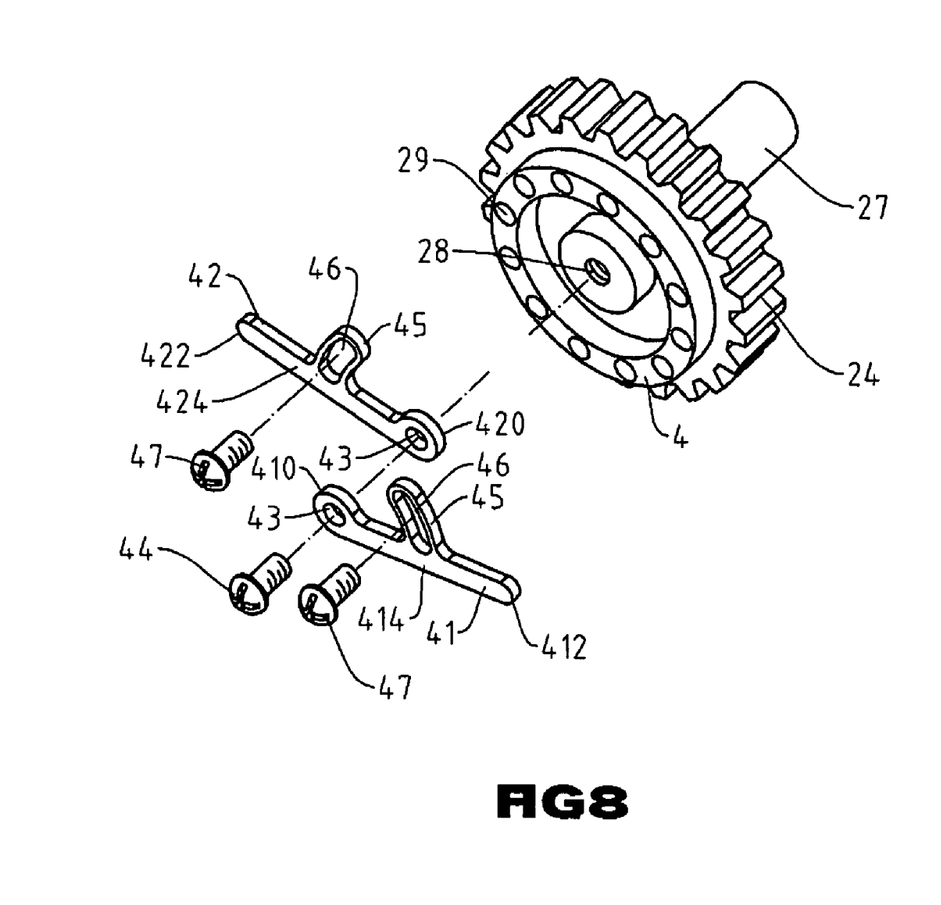
FIG. 8 shows an exploded perspective view of a portion of the travel limit detection/control device of FIG. 6.

According to the preferred form shown, reduction/transmission mechanism 20 includes a power input section 21 in the most preferred form shown as a worm wheel mounted on a shalt 25 and meshed with a worm section 13 of screw rod 12 (FIGS. 5-7). Reduction/transmission mechanism 20 further includes a reduction/output section 22 coupled to power input section 21. According to the most preferred form shown, reduction/output section 22 includes a reduction gear train having a first smaller gear 211 mounted on shaft 25 and meshed with a reduction gear 23 mounted on another shaft 26. A second smaller gear 221 is mounted on shaft 26 and meshes with an output gear 24 mounted on an end of an output shaft 27 (FIG. 6). A screw hole 28 is defined in an end face of the end of output shaft 27 (FIG. 8). An annular flange 4 extends from an outer side of output gear 24 in a direction parallel to an axis of output shaft 27. Annular flange 4 includes a plurality of annularly spaced positioning holes 29 in an outer end face thereof perpendicular to the axis of output shaft 27. Positioning holes 29 surround and are concentric with screw hole 28.

According to the preferred form shown, a control box 50 is provided for mounting and/or receiving reduction/transmission mechanism 20, power breakdown mechanism 30, and travel transmission mechanism 40. Control box 50 includes a side 54 mounted at a side of table 1. An end of screw rod 12 is extended through the other side 55 of control box 50 and coupled with a hand wheel 14 for manually rotating screw rod 12. Thus, table 1 can be moved by electric motor 11 or hand wheel 14. Control box 50 includes a hollow box body 51, a panel 52, and an inner frame 53. A plurality of control switches or buttons 58 for controlling movement of table 1 and milling operations are mounted on panel 52. Also mounted on panel 52 is a speed display 52 that shows the speed of table 1. Shafts 25, 26, and 27 are rotatably supported by inner frame 53. Panel 52 further includes an opening 56 and a slot 57 (FIG. 7). Output gear 24 and the end of output shaft 27 are received in a spacing between panel 52 and inner frame 53 with annular flange 4 received in opening 56 of panel 52 (FIG. 6).

According to the preferred form shown, power breakdown mechanism 30 includes first and second activating members 31 and 32 in the most preferred form shown as two limit switches mounted on panel 52 and spaced from each other. Each of first and second activating members 31 and 32 includes an arm 33, 34 extending through slot 57 of panel 52 and located above panel 52. According to the most preferred form shown, power breakdown mechanism 30 further includes first and second resilient plates 35 and 36 each having a first end 38 fixed to panel 52 and a second end 39 abutting one of the arms 33 and 34 (FIG. 7).

Figure 9:
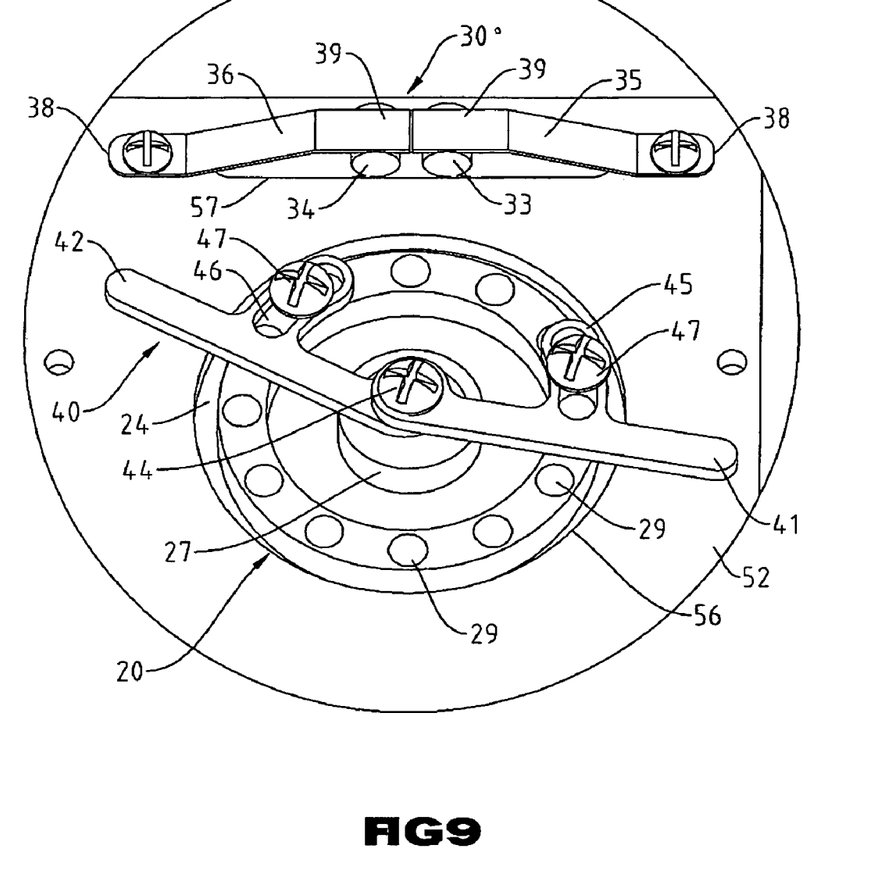
FIG. 9 is a view similar to FIG. 7, illustrating adjustment of travel limits.

According to the preferred form shown, travel transmission mechanism 40 includes first and second travel setting members 41 and 42 each having a first end 410, 420 with a through-hole 43, a second end 412, 422, and an intermediate portion 414, 424 between the first and second ends 410 and 412, 420 and 422. Each of first and second travel setting members 41 and 42 further includes an extension 46 extending from intermediate portion 414, 424 and having an arcuate slot 46. Each arcuate slot 46 has a length larger than a diameter of each positioning hole 29. First ends 410 and 420 of first and second travel setting members 41 and 42 are mounted to the end of output shaft 27 with first end 420 of second travel setting member 42 sandwiched between the end of output shaft 27 and first end 410 of first travel setting member 41 and with through-holes 43 aligned with screw hole 28. Note that first and second travel setting members 41 and 42 can be mounted to the end of output shaft 27 with first end 410 of first travel setting member 41 sandwiched between the end of output shaft 27 and first end 420 of second travel setting member 42. A screw 44 is extended through through-holes 43 and screw hole 28 to secure first ends 410 and 420 of first and second travel setting members 41 and 42 to the end of output shaft 27. However, pivotal movement of first and second travel setting members 41 and 42 relative to the end of output shaft 27 is allowed when screw 44 is loosened. Note that arcuate slot 46 of each of first and second travel setting members 41 and 42 is concentric with and extends across at least one positioning hole 29 of annular flange 4. A positioning member 47 in the most preferred form shown as a screw is extended through arcuate slot 46 of each of first and second travel setting members 41 and 42 into one of positioning holes 29 allowing joint rotation of first and second travel setting members 41 and 42 and output shaft 27 when positioning member 47 is tightened. However, first and second travel setting members 41 and 42 can pivot relative to output shaft 27 when positioning members 47 are disengaged from positioning holes 29 and when screw 44 is loosened, allowing adjustment of angular positions of first and second travel setting members 41 and 42 relative to output shaft 27. When first and second travel setting members 41 and 42 are in positions shown in FIG. 7, table 1 has larger travel limits, and first and second travel setting members 41 and 42 can rotate through a larger angle before coming in contact with arm 33 or 34. When first and second travel setting members 41 and 42 are in positions shown in FIG. 9, table 1 has smaller travel limits, and first and second travel setting members 41 and 42 can rotate through a smaller angle before coming in contact with arm 33 or 34. Note that first and second travel setting members 41 and 42 are can be adjusted to any desired positions based on the processing distances or travels of the workpiece to set right and right travel limits of table 1.

When milling a workpiece is required, the positions of first and second travel setting members 41 and 42 are adjusted and then fixed based on the processing distances or travels of the workpiece to set right and right travel limits of table 1. The gear reduction ratio of reduction/transmission mechanism 20 can be set to be 1:160 or 1:180. Table 1 travels through 800 mm when screw rod 12 together with its worm section 13 rotates 160 rounds. First and second travel setting members 41 and 42 can rotate 320 degrees or more if they are in positions shown in FIG. 7.

Figure 10:
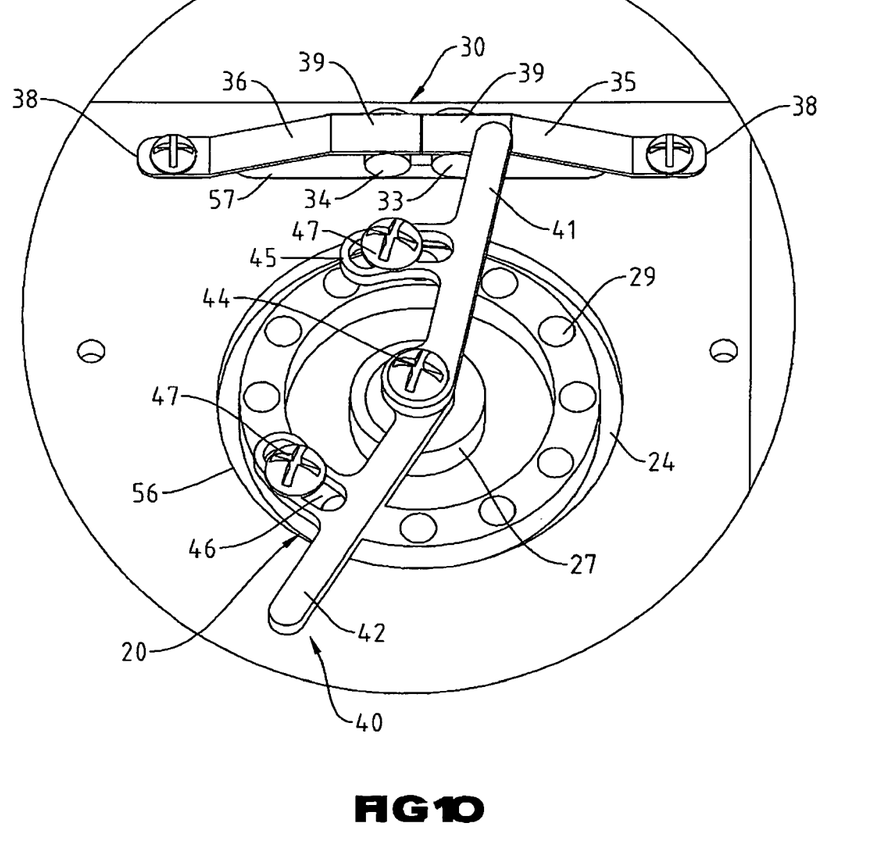
FIG. 10 is a view similar to FIG. 9 with a first travel limit setting member in its travel limit position.
Figure 11:
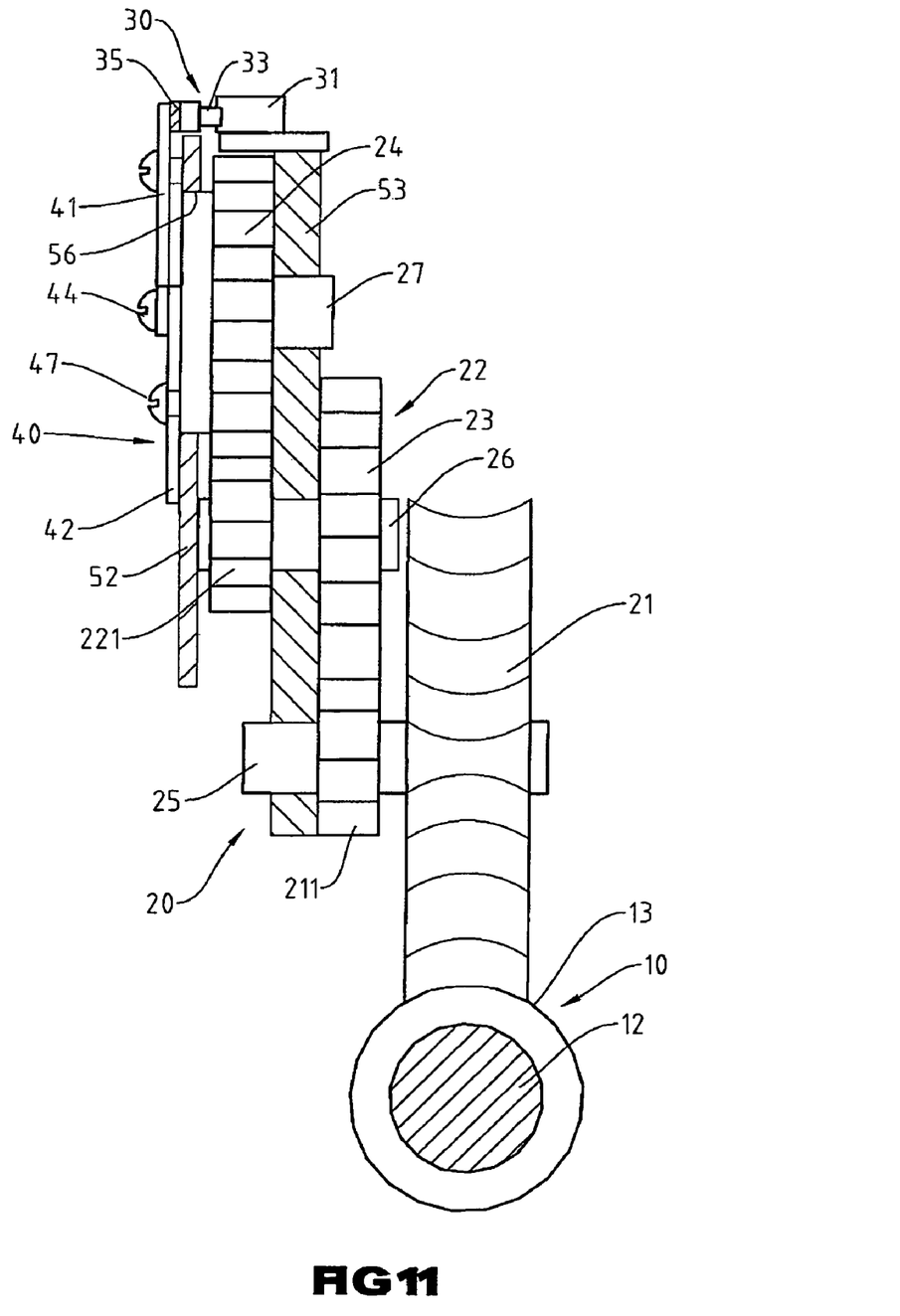
FIG. 11 shows a cross sectional view of the travel limit detection/control device of FIG. 10.
Figure 12:
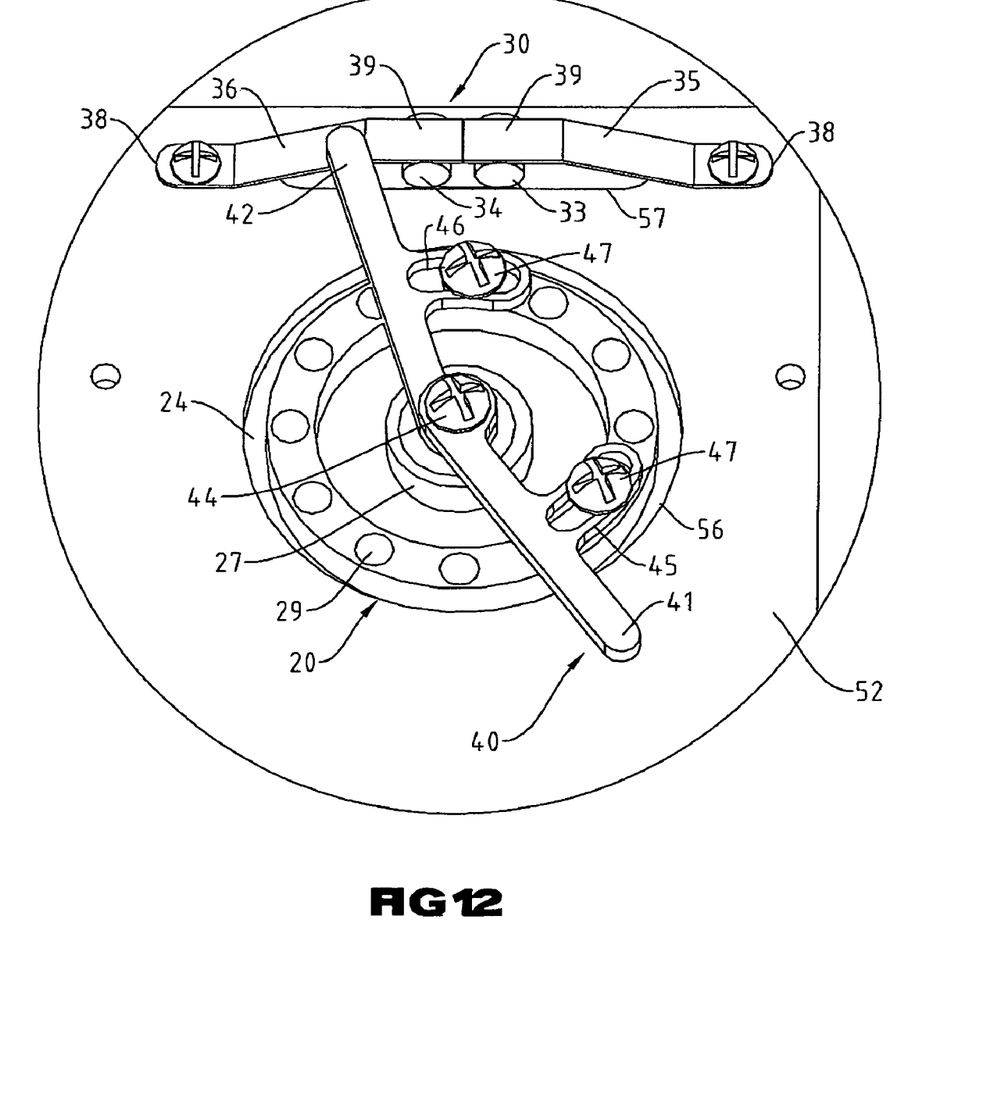
FIG. 12 is a view similar to FIG. 9 with a second travel limit setting member in its limit position.

Now that the basic construction of the travel limit detection/control device of the preferred teachings of the present invention has been explained, the operation and some of the advantages of the travel limit detection/control device can be set forth and appreciated. For ease of explanation, it is assumed that first and second travel setting members 41 and 42 are in positions shown in FIG. 9. In milling operation, when screw rod 12 rotates clockwise, first and second travel setting members 41 and 42 rotate counterclockwise through transmission by power input section 21 and output gear 24 and output shaft 27 of reduction/output section 22. A left travel limit is reached when first travel setting member 41 comes in contact with arm 33 of first activating member 31 (FIGS. 10 and 11), and first activating member 31 cuts power supply to electric motor 11. Screw rod 12 and table 1 are, thus, stopped. On the other hand, when screw rod 12 rotates counterclockwise, first and second travel setting members 41 and 42 rotate clockwise through transmission by power input section 21 and output gear 24 and shaft 27 of reduction/output section 22. A right travel limit is reached when second travel setting member 42 comes in contact with arm 34 of second activating member 32 (FIG. 12), and second activating member 32 cuts power supply to electric motor 11. Screw rod 12 and table 1 are, thus, stopped.

The travel limit detection/control device according to the preferred teachings of the present invention allows reliable detection and control of travel limit of table 1 through simple operation without utilizing exposed wires and exposed limit switches. The problems of exposed wires and exposed limit switches no longer exist. Thus, travel limit detection/control device according to the preferred teachings of the present invention is more durable.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A travel limit detection and control device for a table of a milling machine, with the milling machine including a feeding device having a screw rod connected to the table, with the table being movable between first and second travel limits, with the travel limit detection and control device comprising, in combination:

a power input section adapted to be driven by the screw rod;

a reduction and output section coupled to and driven by the power input section;

first and second activating members adapted for cutting power supply to the feeding device;

a first travel setting member including a first end coupled to and driven by the reduction and output section and a second end, with the second end of the first travel setting member coming in contact with the first activating member when the table reaches the first travel limit, with the first activating member cutting power supply to the feeding device; and a second travel setting member including a first end coupled to and driven by the reduction and output section and a second end, with the second end of the second travel setting member coming in contact with the second activating member when the table reaches the second travel limit, and with the second activating member cutting power supply to the feeding device.

2. The travel limit detection and control device as claimed in claim 1, with the screw rod including a worm section, with the power input section including a worm wheel meshed with the worm section, with the reduction and output section including a reduction gear train having an output shaft and an output gear mounted on the output shaft, and with the first ends of the first and second travel setting members being coupled to and driven by the output shaft.

3. The travel limit detection and control device as claimed in claim 2, with the output shaft including a screw hole in an end face thereof, with the first end of the first travel setting member including a first through-hole aligned with the screw hole, with the first end of the second travel setting member including a second through-hole aligned with the first through-hole and the screw hole, and with the travel limit detection and control device further comprising, in combination: a screw extending through the through-holes and the screw hole, allowing joint rotation of the first and second travel setting members and the output shaft.

4. The travel limit detection and control device as claimed in claim 3, with the output gear including a plurality of annularly spaced positioning holes in a side thereof, with the plurality of positioning holes surrounding and being arranged in a pattern that is concentric with the screw hole, with the first travel setting member further including a first intermediate portion between the first and second ends thereof, with a first extension extending outward from the first intermediate portion and including a first arcuate slot having a length larger than a diameter of each of the plurality of positioning holes, with the first arcuate slot being concentric with the pattern of the plurality of positioning holes and extending across at least one of the plurality of positioning holes, with the second travel setting member further including a second intermediate portion between the first and second ends thereof, with a second extension extending outward from the second intermediate portion and including a second arcuate slot having a length larger than the diameter of each of the plurality of positioning holes, with the second arcuate slot being concentric with the pattern of the plurality of positioning holes and extending across at least one of the plurality of positioning holes, with the travel limit detection and control device further comprising, in combination: a first positioning member removably extended through the first arcuate slot into one of the plurality of positioning holes; and a second positioning member removably extended through the second arcuate slot into another of the plurality of positioning holes.

5. The travel limit detection and control device as claimed in claim 4, with the side of the output gear including an annular flange extending outward in a direction parallel to an axis of the output shaft, with the annular flange including an outer end face perpendicular to the axis of the output shaft, and with the plurality of positioning holes being formed in the outer end face.

6. The travel limit detection and control device as claimed in claim 5, further comprising, in combination: a control box including a control box body receiving the power input section and the reduction and transmission section; a panel having an opening; and an inner frame, with a spacing being formed between the panel and the inner frame, with the reduction gear train including a reduction gear train shaft on which the worm wheel is mounted, with the reduction gear train shaft and the output shaft being rotatably supported by the inner frame, with the output gear and the end of the output shaft being received in the spacing between the panel and the inner frame, and with the annular flange being received in the opening of the panel.

7. The travel limit detection and control device as claimed in claim 6, with the panel further including a slot, with each of the first and second activating members being a limit switch, with each of the limit switches including an arm extending through the slot, with the second end of the first travel setting member coming in contact with the arm of one of the limit switches when the table reaches the first travel limit, with the first activating member cutting power supply to the feeding device, with the second end of the second travel setting member coming in contact with the arm of another of the limit switches when the table reaches the second travel limit, and with the second activating member cutting power supply to the feeding device.

8. The travel limit detection and control device as claimed in claim 7, with the control box body including opposite first and second sides, with the feeding device including an electric motor rotatably supported by the first side of the control box body, with the screw rod being coupled to the electric motor by a belt and pulley transmission device, and with the screw rod including an end extending through the second side of the control box body and adapted to be coupled to a handle wheel.

* * * * *